United States Patent
Chang et al.

(10) Patent No.: US 6,993,451 B2
(45) Date of Patent: Jan. 31, 2006

(54) 3D INPUT APPARATUS AND METHOD THEREOF

(75) Inventors: Wook Chang, Seoul (KR); Dong-yoon Kim, Seoul (KR); Kyoung-ho Kang, Yongin-si (KR); Eun-seok Choi, Anyang-si (KR); Won-chul Bang, Seongnam-si (KR)

(73) Assignee: Samsung Electronics Co., Ltd., Gyeonggi do (KR)

( * ) Notice: Subject to any disclaimer, the term of this patent is extended or adjusted under 35 U.S.C. 154(b) by 0 days.

(21) Appl. No.: 10/868,959

(22) Filed: Jun. 17, 2004

(65) Prior Publication Data
US 2004/0260507 A1    Dec. 23, 2004

(30) Foreign Application Priority Data
Jun. 17, 2003    (KR) .................... 10-2003-0039124

(51) Int. Cl.
G01C 9/00    (2006.01)
G06F 15/00    (2006.01)

(52) U.S. Cl. ..................................... 702/153
(58) Field of Classification Search ............... 702/94, 702/95, 141, 142, 150–154; 178/18.01, 19.01, 178/19.05; 345/156, 158, 179, 180, 182, 345/183
See application file for complete search history.

(56) References Cited

U.S. PATENT DOCUMENTS

| | | | | |
|---|---|---|---|---|
| 5,902,968 A | * | 5/1999 | Sato et al. | 178/19.01 |
| 5,981,884 A | * | 11/1999 | Sato et al. | 178/19.01 |
| 2003/0080958 A1 | * | 5/2003 | Matsumoto et al. | 345/421 |

FOREIGN PATENT DOCUMENTS

JP    07-294240    * 10/1995

* cited by examiner

*Primary Examiner*—Michael Nghiem
(74) *Attorney, Agent, or Firm*—Sughrue Mion, PLLC

(57) ABSTRACT

Provided are a 3D input apparatus and method for precisely detecting a position of the 3D input apparatus. The 3D input apparatus includes a sensor package which measures a first velocity an acceleration, and an angular velocity of the 3D input apparatus in a relative body coordinate system; a posture information generating unit, which generates posture information of the 3D input apparatus using the measured acceleration and angular velocity; a velocity transformation unit, which transforms the measured first velocity into a second velocity in an absolute coordinate system using the posture information; and a position restoration unit, which determines a position of the 3D input apparatus by integrating the second velocity.

14 Claims, 6 Drawing Sheets

3D INPUT APPARATUS AND METHOD THEREOF

This application is based upon and claims the benefit of priority from Korean Patent Application No. 2003-39124, filed on Jun. 17, 2003, in the Korean Intellectual Property Office, the disclosure of which is incorporated herein in its entirety by reference.

BACKGROUND OF THE INVENTION

1. Field of the Invention

The invention relates to an apparatus and method for inputting information, and more particularly, to a 3D input apparatus and method thereof for restoring a spatial position of the apparatus.

2. Description of the Related Art

Conventionally, an input apparatus including a 2-dimensional sensor array, such as an LCD tablet or a digitizer table, has been widely used to input handwritten data using a pen into a personal portable terminal or a computer appliance. Such an input apparatus requires an additional sensing plane surface where a large 2-dimensional sensor array is disposed. Thus, the input apparatus not only occupies a predetermined space, but is also inconvenient for carrying, and very expensive.

Recently, there has been an increased demand for small-sized personal portable terminals, and watch-type or purse-type portable terminals have been developed. Due to this growing tendency to scale down portable terminals, display screens have also been scaled down. Thus, inputting data by natural handwriting using a conventional tablet is difficult.

Accordingly, it may be effective to enable document input using only a single electronic pen on an ordinary plane surface, instead of on a physical tablet. That is because the single electronic pen can provide a larger input space than a conventional pen input device does, and subsequently enable natural handwriting input.

Such an electronic pen, enabling the input on the ordinary plane surface, operates in a self-movement sensing manner. To input a document or a picture using the electronic pen, positions of the pen's tip in a reference coordinate system should be obtained successively. However, in most cases, while the electronic pen is in contact with the plane surface in a state of handwriting, it is separated from the plane surface in a state of non-handwriting or moving. Accordingly, a device is required for precisely measuring positions of the pen even while the pen is separated from the plane surface.

To overcome these problems, U.S. Pat. No. 5,902,968 and U.S. Pat. No. 5,981,884 disclose a method of obtaining positions of a tip of a pen that includes a 3-axis acceleration sensor and a 3-axis Gyro sensor. In this method, a typical inertial navigation system (INS) is applied in the electronic pen. The 3-axis acceleration sensor, mounted on the electronic pen, measures accelerations on the x-, y-, and z-axes, and the 3-axis Gyro sensor measures Euler angles that are expressed as a roll angle $\Phi$, a pitch angle $\Theta$, and a yaw angle $\Psi$. Thus, a posture and an acceleration of the pen in an absolute coordinate system are measured such that a user's handwriting is reproduced.

A position of the above-described electronic pen is detected by doubly integrating the acceleration that is obtained using the acceleration sensor. Since an error obtained from the acceleration sensor is also doubly integrated, however, the positional error caused by the acceleration error greatly increases over time so that the position of the electronic pen cannot be accurately detected.

SUMMARY OF THE INVENTION

The invention provides a 3D input apparatus and method for enabling a position of the 3D input apparatus to be precisely detected by combining a conventional inertial navigation system (INS) with a velocity sensor.

According to an aspect of the invention, there is provided a 3D input apparatus for detecting input information comprising a sensor package measuring a first velocity an acceleration, and an angular velocity of the 3D input apparatus in a relative body coordinate system; a posture information generating unit generating posture information of the 3D input apparatus using the measured acceleration and angular velocity; a velocity transformation unit transforming the measured first velocity into a second velocity in an absolute coordinate system using the posture information; and a position restoration unit determining a position of the 3D input apparatus by integrating the second velocity.

The velocity transformation unit may generate a direction cosine matrix using the posture information, and transform the first velocity into the second velocity by using the direction cosine matrix.

The posture information generating unit may include an initial posture information generator, which generates initial posture information of the 3D input apparatus using an acceleration measured while the 3D input apparatus is at rest, and a moving posture information generator, which generates moving posture information of the 3D input apparatus using the angular velocity and the initial posture information.

According to another aspect of the invention, there is provided a 3D input method for restoring input information. The method comprises measuring a first velocity, an acceleration, and an angular velocity of a 3D input apparatus in a relative body coordinate system; generating posture information of the 3D input apparatus by using the measured acceleration and angular velocity; transforming the measured first velocity into a second velocity of an absolute coordinate system using the posture information; and determining a position of the 3D input apparatus by integrating the second velocity.

The transforming of the first velocity into the second velocity may comprise generating a direction cosine matrix using the posture information and transforming the first velocity into the second velocity by using the direction cosine matrix.

The generating of the posture information may comprise generating initial posture information of the 3D input apparatus using an acceleration measured while the 3D input apparatus is at rest; and generating moving posture information of the 3D input apparatus using the angular velocity and the initial posture information.

BRIEF DESCRIPTION OF THE DRAWINGS

The above and other objects, features and advantages of the invention will become more apparent by describing in detail exemplary embodiments thereof with reference to the attached drawings in which.

DETAILED DESCRIPTION OF THE INVENTION

The invention will now be described more fully with reference to the accompanying drawings, in which exemplary embodiments of the invention are shown. The described exemplary embodiments are intended to assist the understanding of the invention, and are not intended to limit the scope of the invention in any way.

Figure 1A:
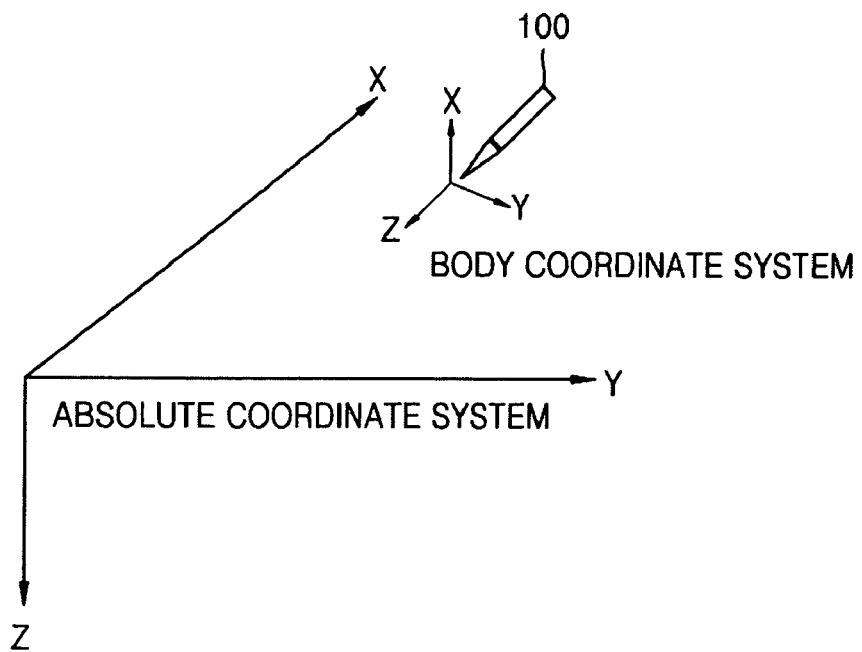
FIG. 1A illustrates coordinate systems that are used in the invention.
Figure 1B:
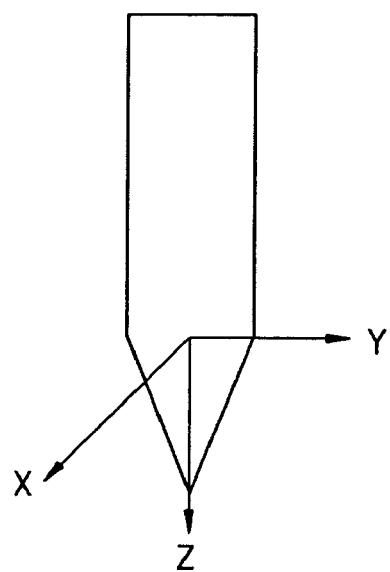
FIG. 1B illustrates a 3D input apparatus with various sensors according to the invention.

FIG. 1A illustrates coordinate systems that are used in the invention, and FIG. 1B illustrates a 3D input apparatus with various sensors according to the invention.

Referring to FIG. 1A, coordinate systems that are used in the invention are classified into an absolute coordinate system and a body coordinate system. The absolute coordinate system is a Cartesian coordinate system with the x-, y- and z- axes that are perpendicular to one another. Here, a gravitational field is directed along the z-axis of the absolute coordinate system. The body coordinate system is another Cartesian coordinate system with one axis directed along a predetermined direction of the 3D input apparatus. For example, as shown in FIGS. 1A and 1B, the z-axis of the body coordinate system may be directed along a direction of a nib of the 3D input apparatus 100.

Figure 2:
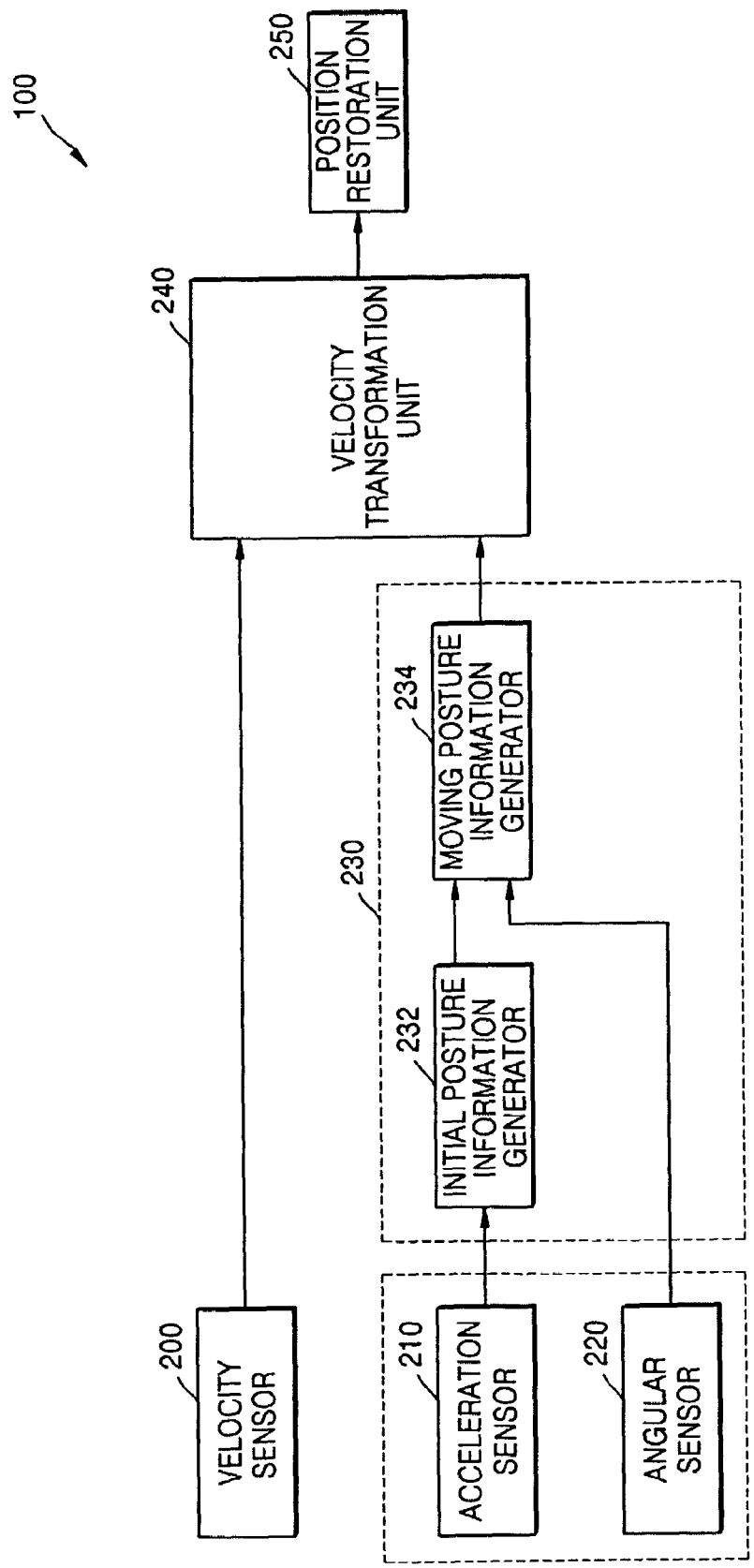
FIG. 2 is a block diagram of a 3D input apparatus according to an exemplary embodiment of the invention.

FIG. 2 is a block diagram of a 3D input apparatus according to the invention. The 3D input apparatus 100 includes a velocity sensor 200, an acceleration sensor 210, and an angular velocity sensor 220. The velocity sensor 200, the acceleration sensor 210, and the angular velocity sensor 220 measure a velocity, an acceleration, and an angular velocity, respectively, of the 3D input apparatus 100 that may be induced by a movement of the 3D input apparatus 100 along axes of the body coordinate system.

In the invention, the 3D input apparatus 100 employs as the velocity sensor 200 an optical translation measurement sensor (OTM sensor), which measures a movement of surface relative to the sensor by using laser technology and the Doppler effect and outputs the result as a velocity of each axis of the body coordinate system. The 3-axis acceleration sensor and the 3-axis angular velocity sensor are used as the acceleration sensor 210 and the angular velocity sensor 220, respectively.

Also, the 3D input apparatus 100 comprises a posture information generating unit 230, which generates posture information of the input apparatus by using the measured acceleration and angular velocity. This posture information generating unit 230 includes an initial posture information generator 232 and a moving posture information generator 234. The initial posture information generator 232 generates initial posture information of the 3D input apparatus 100 by using a measured acceleration induced by the gravitational force when the 3D input apparatus is at rest. The moving posture information generator 234 generates moving posture information of the 3D input apparatus 100 by using the angular velocity measured during the 3D input apparatus is moving and the initial posture information.

The 3D input apparatus 100 further includes a velocity transformation unit 240 and a position restoration unit 250. The velocity transformation unit 240 transforms the velocity of the body coordinate system, which is input from the velocity sensor 200, into a velocity of the absolute coordinate system, and the position restoration unit 250 integrates the transformed velocity of the absolute coordinate system and determines the position of the 3D input apparatus 100.

The posture information generating unit 230 expresses the posture information of the 3D input apparatus 100 using Euler angles, which include a roll angle $\Phi$, a pitch angle $\Theta$, and a yaw angle $\Psi$, and outputs the Euler angles to the velocity transformation unit 240. By using the Euler angles, the velocity transformation unit 240 transforms the velocity of the body coordinate system, which is measured by the velocity sensor 200, into a velocity of the absolute coordinate system.

FIGS. 3A through 3E illustrate a process of transforming a body coordinate system into an absolute coordinate system using Euler angles.

Figure 3A:
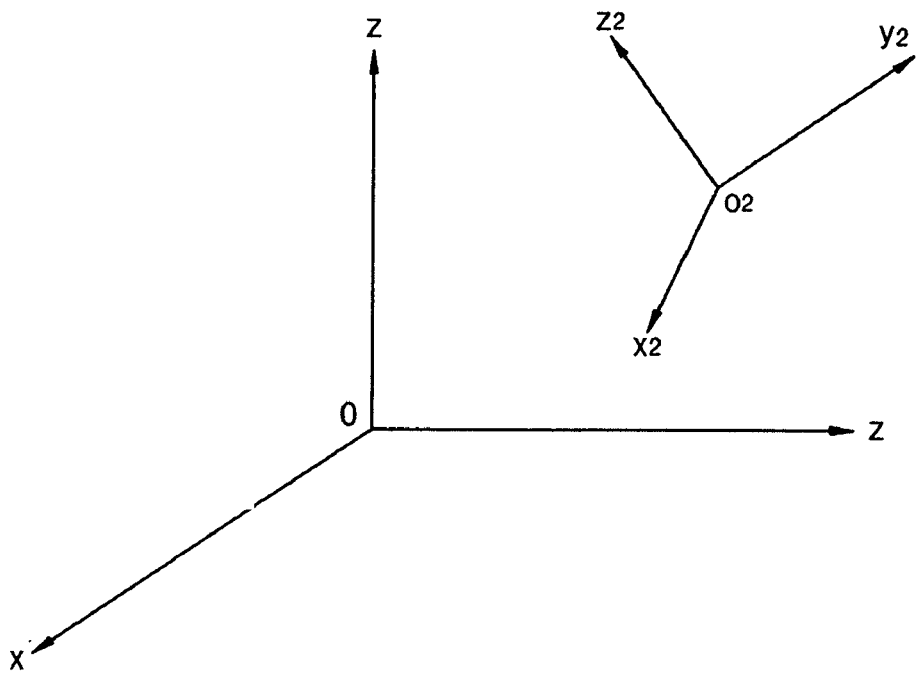
FIGS. 3A through 3E illustrate a process of transforming a body coordinate system into an absolute coordinate system using Euler angles.

FIG. 3A illustrates an (x, y, z) coordinate system and an (x2, y2, z2) coordinate system whose axes are rotated relative to one another. Here, an arbitrary position or vector in space is expressed differently according to the coordinate systems. If the (x, y, z) coordinate system is used, an arbitrary position or vector in space can be completely described by a position of an origin O2 of the (x2, y2, z2) coordinate system measured in the (x, y, z) coordinate system, and a direction cosine matrix. Similarly, if the (x2, y2, z2) coordinate system is used, an arbitrary position or vector in space can be described by a position of an origin O of the (x, y, z) coordinate system measured in the (x2, y2, z2) coordinate system, and the direction cosine matrix. The direction cosine matrix describes a relative rotation between two coordinate systems and is expressed using Euler angles.

Figure 3B:
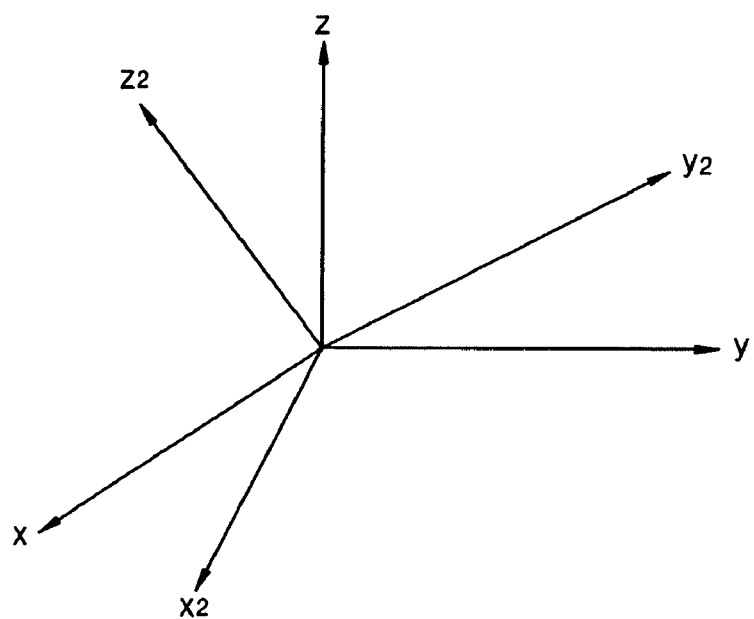

The direction cosine matrix and Euler angles will now be described with reference to FIG. 3B. In FIG. 3B, the origins of the two coordinate systems shown in FIG. 3A coincide with each other. Since the direction cosine matrix describes only a relative rotation between the two coordinate systems and is independent of a distance between the origins of the two coordinate systems, it can be described using FIG. 3B.

Figure 3C:
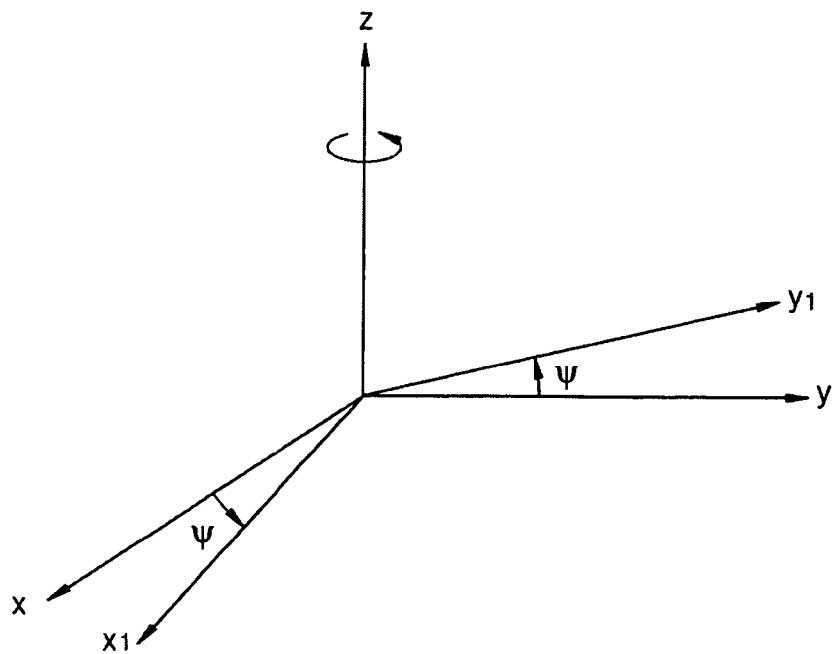

The (x, y, z) coordinate system can be transformed into the (x2, y2, z2) coordinate system through a 3-operation rotational transformation process. Firstly, the (x, y, z) coordinate system is transformed into an (x1, y1, z1) coordinate system by rotating the (x, y, z) coordinate system by an angle of $\Psi$ about the z-axis, as shown in FIG. 3C. This rotational transformation is given by $$\begin{bmatrix} x1 \\ y1 \\ z \end{bmatrix} = \begin{bmatrix} \cos\psi & \sin\psi & 0 \\ -\sin\psi & \cos\psi & 0 \\ 0 & 0 & 1 \end{bmatrix} \begin{bmatrix} x \\ y \\ z \end{bmatrix} \quad (1)$$

where $\Psi$ is defined as a yaw angle.

Figure 3D:
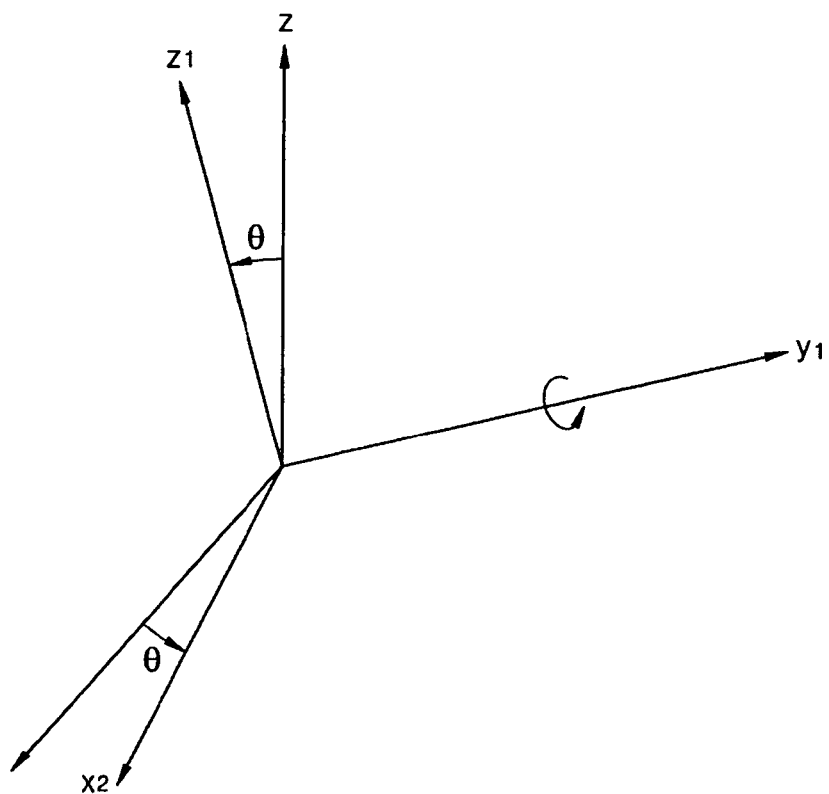

Secondly, the (x1, y1, z1) coordinate system, obtained from the yaw transformation, is transformed into a (x2, y1, z1) coordinate system by rotating the (x1, y1, z1) coordinate system by an angle of $\Theta$ about the y1-axis, as shown in FIG. 3D. This rotational transformation is given by $$\begin{bmatrix} x2 \\ y1 \\ z1 \end{bmatrix} = \begin{bmatrix} \cos\theta & 0 & -\sin\theta \\ 0 & 1 & 0 \\ \sin\theta & 0 & \cos\theta \end{bmatrix} \begin{bmatrix} x1 \\ y1 \\ z \end{bmatrix} \quad (2)$$

where $\Theta$ is defined as a pitch angle.

Figure 3E:
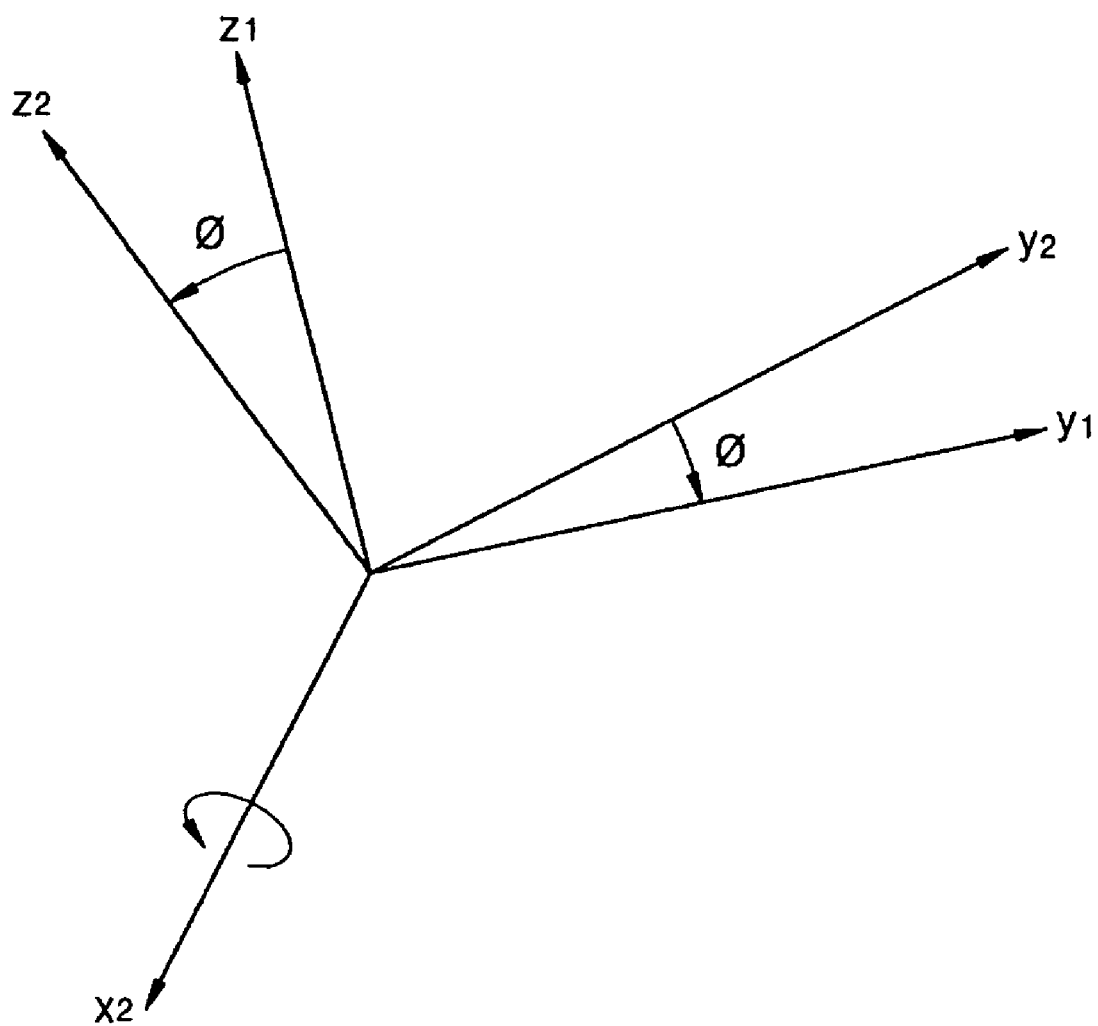

Thirdly, the (x2, y1, z1) coordinate system, obtained from the pitch transformation and described in Equation 2, is transformed into the (x2, y2, z2) coordinate system by rotating the (x2, y1, z1) coordinate system at an angle of $\Phi$ about the x2-axis, as shown in FIG. 3E. This roll rotational transformation is given by $$\begin{bmatrix} x2 \\ y2 \\ z2 \end{bmatrix} = \begin{bmatrix} 1 & 0 & 0 \\ 0 & \cos\phi & \sin\phi \\ 0 & \sin\phi & \cos\phi \end{bmatrix} \begin{bmatrix} x2 \\ y1 \\ z1 \end{bmatrix} \quad (3)$$

where $\Phi$ is defined as a roll angle.

Thus, the (x2, y2, z2) coordinate system can be obtained from the (x, y, z) coordinate system using the yaw, pitch, and roll transformations expressed in Equations 1, 2, and 3 to obtain $$\begin{bmatrix} x2 \\ y2 \\ z2 \end{bmatrix} = \begin{bmatrix} 1 & 0 & 0 \\ 0 & \cos\phi & \sin\phi \\ 0 & -\sin\phi & \cos\phi \end{bmatrix} \begin{bmatrix} \cos\theta & 0 & -\sin\theta \\ 0 & 1 & 0 \\ \sin\theta & 0 & \cos\theta \end{bmatrix} \begin{bmatrix} \cos\psi & \sin\psi & 0 \\ -\sin\psi & \cos\psi & 0 \\ 0 & 0 & 1 \end{bmatrix} \begin{bmatrix} x \\ y \\ z \end{bmatrix}$$

$$= \begin{bmatrix} \cos\psi\cos\theta & \sin\psi\cos\theta & -\sin\psi \\ -\sin\psi\cos\phi + \cos\psi\sin\theta\sin\phi & \cos\psi\cos\phi + \sin\psi\sin\theta\sin\phi & \cos\theta\sin\phi \\ \sin\psi\sin\phi + \cos\psi\sin\theta\cos\phi & -\cos\psi\sin\phi + \sin\psi\sin\theta\cos\phi & \cos\theta\cos\phi \end{bmatrix} \begin{bmatrix} x \\ y \\ z \end{bmatrix}$$

$$= C_{xyz}^{x2y2z2} \begin{bmatrix} x2 \\ y \\ z \end{bmatrix} \quad (3)$$

where $C_{xyz}^{x2y2z2}$ is defined as the direction cosine matrix. Here, the direction cosine matrix has the following orthonormality:

$$(C_{xyz}^{x2y2z2})^T C_{xyz}^{x2y2z2} = C_{xyz}^{x2y2z2}(C_{xyz}^{x2y2z2})^T = I \quad (5)$$

where $(\ )^T$ is a transpose of an arbitrary matrix $(\ )$, and I is a unit matrix.

As described above, a relative rotation between two coordinate systems can be described by the direction cosine matrix, and the direction cosine matrix is a function of the roll, pitch, and yaw angles. Therefore, by obtaining the roll, pitch, and yaw angles, the relative rotation between two coordinate systems can be described.

If the direction cosine matrix is used, an arbitrary vector v in the (x, y, z) coordinate system can be described in the (x2, y2, z2) coordinate system given by $$[v]_{x2y2z2} = C_{xyz}^{x2y2z2} [v]_{xyz} \quad (6)$$

Here, $[v]_{x2y2z2}$ and $[v]_{xyz}$ are the vectors v described in the (x, y, z) and (x2, y2, z2) coordinate systems, respectively. Thus, a velocity and an acceleration of the body coordinate system according to the invention can be transformed into a velocity and an acceleration of the absolute coordinate system using the above-described direction cosine matrix.

Hereinafter, the direction cosine matrix for transforming a velocity and an acceleration of the body coordinate system into a velocity and an acceleration of the absolute coordinate system is given by $$C_b^n = \begin{bmatrix} \theta_c\psi_c & -\phi_c\psi_s + \phi_s\theta_s\psi_c & \phi_s\psi_s + \phi_c\theta_s\psi_c \\ \theta_c\psi_s & \phi_c\psi_c + \phi_s\theta_s\psi_s & -\phi_s\psi_c + \phi_c\theta_s\psi_s \\ -\theta_s & \phi_s\theta_c & \phi_c\theta_c \end{bmatrix} \quad (7)$$

where $C_b^n$ is a transpose of $C_{xyz}^{x2y2z2}$ expressed in Equation 4, $\phi_c$ and denote cos $\phi$ and sin $\phi$, respectively. Similarly, $\theta_c$, $\theta_s$, $\psi_c$, and $\psi_s$ denote cos $\theta$, sin $\theta$, cos $\psi$, and sin $\psi$, respectively.

Figure 4:
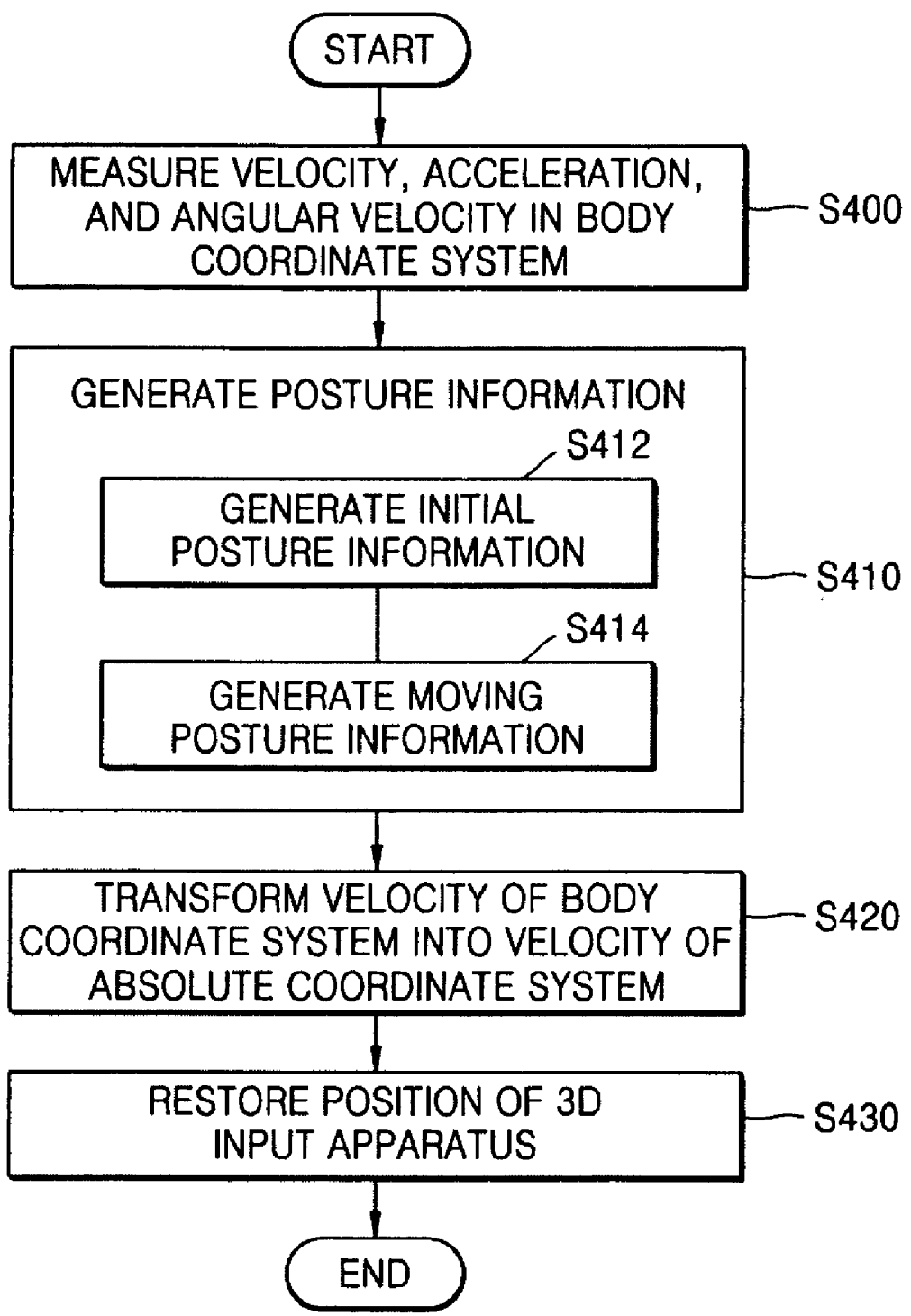
FIG. 4 is a flowchart illustrating a 3D input method according to an exemplary embodiment of the invention.

FIG. 4 is a flow chart illustrating a 3D input method according to an exemplary embodiment of the invention. Referring to FIG. 4, when the 3D input apparatus 100 is driven, a velocity sensor 200, an acceleration sensor 210, and an angular velocity sensor 220 measure a velocity ($V_{bx}$, $V_{by}$, $V_{bz}$), an acceleration ($A_{bx}$, $A_{by}$, $A_{bz}$), and an angular velocity ($\omega_{bx}$, $\omega_{by}$, $\omega_{bz}$) of the 3D input apparatus 100, respectively, in operation S400.

In operation S410, a posture information generating unit 230 receives the acceleration and the angular velocity from the acceleration sensor 210 and the angular velocity sensor 220, respectively, and generates posture information on a spatial position of the 3D input apparatus 100 in the absolute coordinate system. The posture information is expressed using Euler angles.

Specifically, while the 3D input apparatus 100 is in a stationary state, the acceleration sensor 210 outputs a constant acceleration, due to the gravitational force, to an initial posture information generator 232. In operation S412, the initial posture information generator 232 obtains pitch and roll angles of the stationary state by using a relationship between a gravitational acceleration g of the absolute coordinate system and an output of an initial acceleration sensor given by $$\begin{bmatrix} A_{bx} \\ A_{by} \\ A_{bz} \end{bmatrix} = -C_n^b \begin{bmatrix} 0 \\ 0 \\ g \end{bmatrix} = \begin{bmatrix} \sin\theta \\ -\cos\theta\sin\phi \\ -\cos\theta\cos\phi \end{bmatrix} g \quad (8)$$

$A_{bx} = -g \sin \theta$ and $A_{bx} = -g \sin \theta$ are obtained from Equation 8, and this results in the pitch and roll angles $\Theta$ and $\Phi$ given by $$\theta = \sin^{-1}\frac{A_{bx}}{g} \quad (9)$$

-continued $$\phi = -\sin^{-1}\frac{A_{by}}{g\cos\theta}$$

In operation S414, the moving posture information generator 234 receives the initial posture information and the angular velocity of each axis from the initial posture information generator 232 and the angular velocity sensor 220, respectively, and generates moving posture information, which is expressed using the Euler angles.

The moving posture information generator 234 solves the following differential Equation 10 by using initial pitch and roll angles and an angular velocity ($\omega_{bx}$, $\omega_{by}$, $\omega_{bz}$) received from the angular velocity sensor 220.

$$\dot{\phi} = w_{bx} + (w_{by}\sin\phi + w_{bz}\cos\phi)\tan\theta$$

$$\dot{\phi} = w_{by}\cos\phi - w_{bz}\sin\phi$$

$$\Psi = \frac{w_{by}\sin\phi + w_{bz}\cos\phi}{\cos\phi} \quad (10)$$

The differential Equation 10 expresses a relationship between the Euler angles and the angular velocity. The moving posture information generator 234 outputs the solved result to a velocity transformation unit 240.

In operation S420, the velocity transformation unit 240 obtains a direction cosine matrix by substituting the Euler angles into Equation 7, and then, according to Equation 11, transforms the velocity ($V_{bx}$, $V_{by}$, $V_{bz}$) of the body coordinate system, which is received from the velocity sensor 200, into a velocity ($V_{nx}$, $V_{ny}$, $V_{nz}$) of the absolute coordinate system by using the direction cosine matrix.

$$P_n^{\cdot} = V_n = C_b^n V_b \quad (11)$$

The velocity transformation unit 240 then outputs the absolute velocity ($V_{nx}$, $V_{ny}$, $V_{nz}$) to a position restoration unit 250.

The position restoration unit 250 integrates the absolute velocity and determines a position of the 3D input apparatus 100 in the absolute coordinate system in operation S430.

The invention can use a combination of hardware and software components. The software can be embodied as computer readable code on a computer readable medium. The computer readable medium is any data storage device that can store data that can thereafter be read by a computer system. Examples of the computer readable medium include read-only memory, random-access memory, CD-ROMs, magnetic tape, optical data storage devices, and carrier waves (such as data transmission through the Internet). The computer readable medium can also be distributed over a network coupled computer system so that the computer readable code is stored and executed in a distributed fashion.

As described above, the invention provides an inertial navigation system combined with a velocity sensor. Therefore, the invention can reduce positional errors caused by acceleration errors that are accumulated over time, which occur in a conventional 3D input apparatus that determines a position by using a double integral of a measured acceleration.

Accordingly, the 3D input apparatus of the invention can reliably restore a position even if spatial information is continuously input at every 10 seconds or more, while overcoming the restrictions of a conventional 3D input apparatus that should be stopped at every 3 to 4 seconds to correct errors using zero-velocity update.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope of the claims will be construed as being included in the invention.

What is claimed is:

1. A 3D input apparatus for detecting input information, comprising:
    a sensor package measuring a first velocity, an acceleration, and an angular velocity of the 3D input apparatus in a relative body coordinate system;
    a posture information generating unit generating posture information of the 3D input apparatus using the measured acceleration and angular velocity;
    a velocity transformation unit transforming the measured first velocity into a second velocity in an absolute coordinate system using the posture information; and
    a position restoration unit determining a position of the 3D input apparatus by integrating the second velocity.

2. The apparatus of claim 1, wherein the velocity transformation unit generates a direction cosine matrix using the posture information, and transforms the first velocity into the second velocity by using the direction cosine matrix.

3. The apparatus of claim 1, wherein the posture information generating unit comprises:
    an initial posture information generator generating initial posture information of the 3D input apparatus using an acceleration measured while the 3D input apparatus is at rest; and
    a moving posture information generator generating moving posture information of the 3D input apparatus using the angular velocity and the initial posture information.

4. The apparatus of claim 1, wherein the sensor package comprises a first sensor measuring the first velocity with respect to each of the three orthogonal axes of the body coordinate system.

5. The apparatus of claim 1, wherein the sensor package comprises a second sensor measuring the acceleration and angular velocity.

6. The apparatus of claim 1, wherein the body coordinate system is a Cartesian coordinate system with one axis directed along a predetermined direction of the 3D input apparatus.

7. The apparatus of claim 6, wherein the predetermined direction is an axial direction of the 3D input apparatus, and a Z axis of the Cartesian coordinate system is aligned along the predetermined direction.

8. A 3D input method for detecting input information, comprising:
    measuring a first velocity, an acceleration, and an angular velocity of a 3D input apparatus in a relative body coordinate system;
    generating posture information of the 3D input apparatus by using the measured acceleration and angular velocity;
    transforming the measured first velocity into a second velocity of an absolute coordinate system using the posture information; and determining a position of the 3D input apparatus by integrating the second velocity.

9. The method of claim 8, wherein the transforming of the first velocity into the second velocity comprises:
generating a direction cosine matrix using the posture information; and
transforming the first velocity into the second velocity by using the direction cosine matrix.

10. The method of claim 8, wherein the generating of the posture information comprises:
generating initial posture information of the 3D input apparatus using an acceleration measured while the 3D input apparatus is at rest; and
generating moving posture information of the 3D input apparatus using the angular velocity and the initial posture information.

11. The method of claim 8, wherein the measuring of the first velocity comprises measuring a velocity with respect to each of three orthogonal axes of the body coordinate system.

12. The method of claim 8, wherein the body coordinate system is a Cartesian coordinate system with one axis directed along a predetermined direction of the 3D input apparatus.

13. The method of claim 12, wherein the predetermined direction is an axial direction of the 3D input apparatus, and a Z axis of the Cartesian coordinate system is aligned along the predetermined direction.

14. A computer readable medium having embodied thereon a computer program for the method according to any one of claims 8 through 13.

* * * * *